R. ARIUCHI.
HORSESHOE.
APPLICATION FILED NOV. 11, 1919.

1,342,615.

Patented June 8, 1920.

INVENTOR
Rikizo Ariuchi
BY
C. F. Blake
ATTORNEY

UNITED STATES PATENT OFFICE.

RIKIZO ARIUCHI, OF PORTLAND, OREGON.

HORSESHOE.

1,342,615.  Specification of Letters Patent.  Patented June 8, 1920.

Application filed November 11, 1919. Serial No. 337,238.

*To all whom it may concern:*

Be it known that I, RIKIZO ARIUCHI, a subject of the Emperor of Japan, and a resident of Portland, county of Multnomah, State of Oregon, have invented certain new and useful Improvements in Horseshoes, of which the following is a specification.

My invention relates to horseshoes in general, and particularly to horseshoes embodying nonslipping devices therein, the object of my invention being to provide a horseshoe embodying a nonslipping device that will operate equally well in either forward or rearward direction, will be detachable when not required, and will be of simple construction.

I accomplish the above objects by means of the construction illustrated in the accompanying drawing, which is a part of this application for Letters Patent, like characters of reference indicating like parts throughout the several views thereof, and in which.

In general my invention consists of a pronged substantially wedge-shaped calk pivotally mounted within the horseshoe transversely thereof, means to retain said calk in its normal position, and means to cause said calk to rotate upon its pivotal mounting when the horse slips either forward or rearward.

Figure 5:
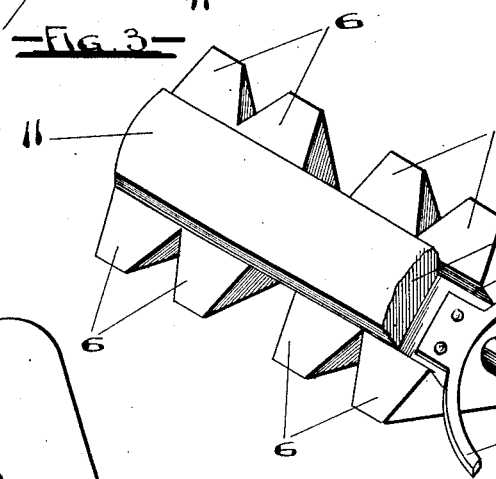
Fig. 5 is a similar view of the calk reversed.
Figure 4:
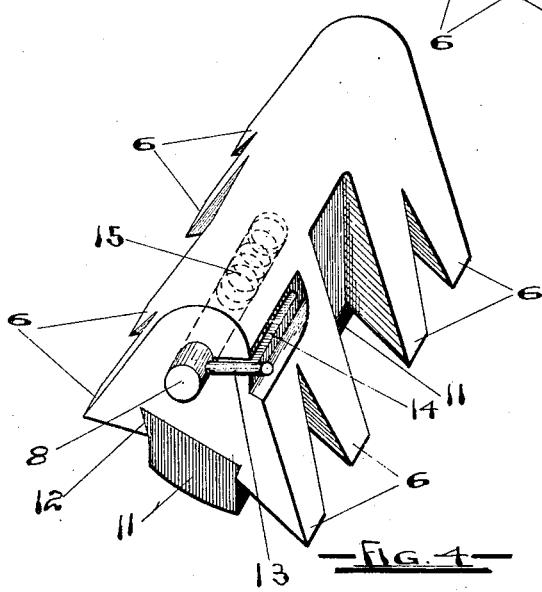
Fig. 4 is an enlarged perspective view of the calk.

The calk is constructed substantially wedge-shaped with a curved apex, as shown in Figs. 4 and 5, the edges of said wedge being cut into or notched to form a plurality of prongs 6 upon each side of the wedge.

Figure 2:
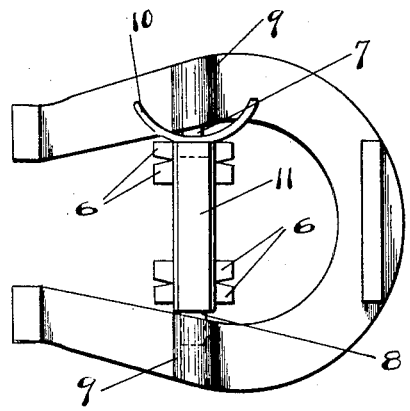
Fig. 2 is a plan view of a horseshoe, looking from beneath, with my device installed thereon.
Figure 1:
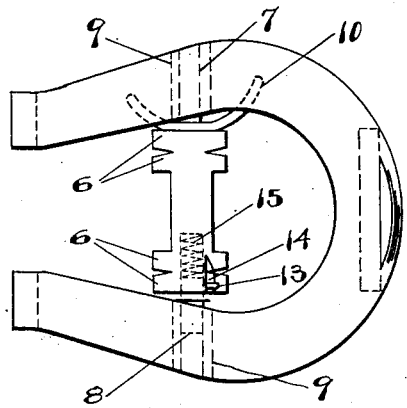
Figure 1 is a plan view of a horseshoe, looking from above, with my device installed thereon.
Figure 3:
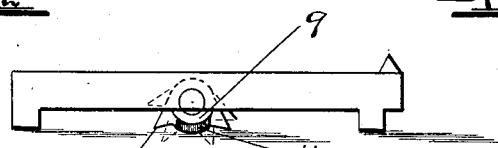
Fig. 3 is a side elevation of a horseshoe with my device installed thereon.

Adjacent the apex of the wedge are provided trunnions 7 and 8 which are mounted within suitable bosses 9 formed upon the lower surface of the horseshoe, as shown in Figs. 1, 2 and 3, the wedge-shaped calk being disposed so that said prongs 6 will be in proximity to the ground.

To retain the calk in normal position as shown in Fig. 3, I provide a spring 10 secured to said calk, and extending upon each side of one of said bosses 9 to contact with the lower surface of the horseshoe, as shown in Figs. 1 and 2.

In order that the slightest tendency toward slipping, either forward or rearward, may cause the calk to rotate upon its pivotal trunnions 7 and 8 and thereby cause the prongs 6 to contact with the ground to prevent further slipping, I provide a member 11, preferably of rubber or cork or leather or the like, inserted within a longitudinal slot 12 in the lower surface of the calk between the prongs 6, as shown in Figs. 4 and 5.

To aid in the mounting of the calk within the horseshoe, I provide that one of the trunnions thereof, shown as 8 in the drawing, shall be slidably mounted within a suitable orifice in the end of the calk, and operated by means of a pin 13 sliding within a slot 14 in the side of the calk, as shown in Figs. 1 and 4. A spring 15 is disposed within the orifice in the end of the calk contacting with the end of the trunnion 8, thereby retaining said trunnion within its respective boss 9 when in use.

My invention may be made of any size and constructed of any materials deemed convenient and suitable for a device of this character; and while I have illustrated and described a form of construction and arrangement of parts found desirable in materializing my invention, I wish to include all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. A horseshoe in combination with a pronged calk pivotally mounted thereon, yieldable means to retain said calk in position, and an elastic pad upon said calk.

2. A horseshoe, a calk, trunnions upon said calk journaled upon said horseshoe, a plurality of prongs upon each edge of the lower face of said calk, an elastic pad upon the lower face of said calk, and yieldable means to retain said calk in position.

3. In a horseshoe, pivotally mounted prongs adapted to be normally out of contact with the ground, and means to cause contact of said prongs with the ground upon slippage of said horseshoe.

In witness whereof, I hereunto affix my signature, in the presence of two witnesses, at Portland, county of Multnomah, State of Oregon, this 26th day of Sept., 1919.

RIKIZO ARIUCHI.

Witnesses:
L. J. ROBINSON,
C. F. BLAKE.